United States Patent [19]

Loeb

[11] 4,171,409
[45] Oct. 16, 1979

[54] METHOD AND APPARATUS FOR GENERATING POWER UTILIZING REVERSE ELECTRODIALYSIS

[75] Inventor: Sidney Loeb, Warrenton, Va.

[73] Assignee: Ben Gurion University of the Negev, Beersheba, Israel

[21] Appl. No.: 877,988

[22] Filed: Feb. 15, 1978

[30] Foreign Application Priority Data

Feb. 25, 1977 [IL] Israel ......................................... 51542

[51] Int. Cl.$^2$ .............................................. H01M 8/04
[52] U.S. Cl. ........................................ 429/17; 429/20; 429/26; 429/70; 290/1 R
[58] Field of Search ........................ 429/17, 19, 20, 26, 429/70, 81; 290/1 R

[56] References Cited

U.S. PATENT DOCUMENTS 3,282,834 11/1966 Justi et al. ........................... 429/17 X
3,296,031 1/1967 Rightmire et al. ...................... 429/17

*Primary Examiner*—Charles F. LeFevour
*Attorney, Agent, or Firm*—Benjamin J. Barish

[57] ABSTRACT

A method and apparatus are described for generating power utilizing reverse electrodialysis in which a concentrated ionic solution and a dilute ionic solution are passed through two pathways in a reverse electrodialysis unit including a membrane stack, whereby solute from the concentrated solution passes through the membrane to the dilute solution accompanied by the generation of an output electrical current and voltage. The concentrated and dilute ionic solutions are regenerated by thermal separation from the solutions exiting from the unit and are recycled back through the unit.

9 Claims, 5 Drawing Figures

METHOD AND APPARATUS FOR GENERATING POWER UTILIZING REVERSE ELECTRODIALYSIS

BACKGROUND OF THE INVENTION

The present invention relates to a method and apparatus for generating power utilizing reverse electrodialysis.

As well known, electrical energy may be generated from the free energy of mixing of two ionic solutions by reverse electrodialysis. This technique utilizes a reverse electrodialysis unit including a membrane stack having alternating cation and anion exchange membranes, an electrode at each end of the stack, a first pathway through the reverse electrodialysis unit for a concentrated ionic solution, and a second pathway through the reverse electrodialysis unit for a dilute ionic solution. When the concentrated ionic solution is introduced into the first pathway, and the dilute ionic solution is introduced into the second pathway, solute from the concentrated solution in the first pathway passes through the membranes to the dilute solution in the second pathway, this being accompanied by the generation of an output electrical current and voltage across the electrodes at the ends of the stack. The voltage generated by the concentration difference across each pair of membranes will be very low, even when there is zero load current, but this voltage is multiplied by increasing the number of alternating cation and anion exchange membranes to separate the two solutions in the membrane stack. Further details of this technique may be had from existing publications, such a "Electric Power From Differences In Salinity", Science, Feb. 13, 1976, Vol. 191, pp 557–9, and the references cited therein.

The above described reverse electrodialysis (hereinafter sometimes called "RED") technique appears to have possibilities for producing low cost energy, particularly with highly concentrated brines. However, insofar as we are aware, all investigators to date have considered this technique only in arrangements wherein one or both of the concentrated and dilute solutions to be mixed (hereinafter sometimes called "mixing pairs") must be continually replenished. Thus, such known techniques could be exploited only where located close to large quantities of mixing pairs, such as: Dead Sea brine, fresh water; Dead Sea brine, sea water; and sea water, river water. In addition, such known techniques involve very significant problems in the transport of the mixing pairs to the plant, and in the disposal of the mixed solution (hereinafter sometimes called "spent brine") exiting from the RED unit.

BRIEF SUMMARY OF THE INVENTION

An object of the present invention is to provide a method and apparatus for generating power by the use of the reverse electrodialysis technique which method and apparatus have advantages in the above respects.

According to one aspect of the present invention, there is provided a method of generating power, comprising: (A) passing a concentrated ionic solution through a first pathway in a reverse electrodialysis unit including a membrane stack having alternating cation and anion exchange membranes and an electrode at each end of the stack; (B) passing a dilute ionic solution through a second pathway in said reverse electrodialysis unit, whereby solute from the concentrated solution in the first pathway passes through the membranes to the dilute solution in the second pathway, this being accompanied by the generation of an output electrical current and voltage; (C) regenerating by thermal separation the original concentrated and dilute ionic solutions from the solutions exiting from the reverse electrodialysis unit; and (D) recycling said regenerated and dilute solutions back through said respective first and second pathways in the reverse electrodialysis unit.

According to another aspect of the invention, there is provided a heat-engine for generating power, comprising: (A) a reverse electrodialysis unit including a membrane stack having alternating cation and anion exchange membranes, an electrode at each end of the stack, a first pathway through the reverse electrodialysis unit for a concentrated ionic solution, and a second pathway through the reverse electrodialysis unit for a dilute ionic solution; (B) means for introducing a concentrated ionic solution into said first pathway; (C) means for introducing a dilute ionic solution into said second pathway, whereby solute from the concentrated solution in the first pathway passes through the membranes to the dilute solution in the second pathway, this being accompanied by the generation of an output electrical current and voltage; (D) thermal separation means for regenerating the original concentrated and dilute ionic solutions from the solutions exiting from the reverse electrodialysis unit; and (E) recycling means for recycling said regenerated concentrated and dilute solutions back to said first and second pathways in the reverse electrodialysis unit.

The above-described technique and system thus fits in every respect the definition of a heat-engine, i.e., a man-made device which makes it possible for a working substance to undergo a cyclic process in the conversion of heat to work. The above-described RED heat engine requires an input only of heat, and produces an output only of useful energy and unused heat. It therefore has a great advantage over existing RED processes, in that it is not restricted to locations possessing large quantities of suitable mixing pairs, i.e. concentrated and dilute solutions. On the contrary, it can be used much more widely, wherever a heat source is available, ambient air or water being usuable as a heat sink. In addition, the above-described RED heat-engine obviates the problems of transporting mixing pairs to the plant, and of disposing the spent brine.

The above-described RED heat-engine also possesses an advantage over presently used heat-engines, such as the vapor-power-cycle engine. In the vapor-power-cycle engine, heat absorption and rejection are intimately associated with the work-producing part of the cycle. In the above-described RED heat engine, however, heat absorption and rejection are utilized only for thermal unmixing. Since thermal unmixing can take place at relatively low temperature differences, the above-described RED heat-engine is especially appropriate where low temperature heat sources are available, such as unconcentrated solar energy, geothermal energy, and waste heat.

The thermal unmixing, or separation, of the mixing pairs may be done by a number of techniques, according to the nature of the intermediate phases employed in the unmixing. Described below is a thermal unmixing technique wherein the concentrated and dilute solutions constituting the mixing pairs are unmixed (i.e., separated or regenerated) by using a liquid and a solid whose solubility in the liquid is a function of temperature. Also described is another technique wherein the separation is effected by distillation.

Further features and advantages of the invention will be apparent from the description below.

BRIEF DESCRIPTION OF THE DRAWINGS

The invention is herein described, somewhat diagrammatically, and by way of example only, with reference to the accompanying drawings, wherein.

DESCRIPTION OF PREFERRED EMBODIMENTS

Figure 1:
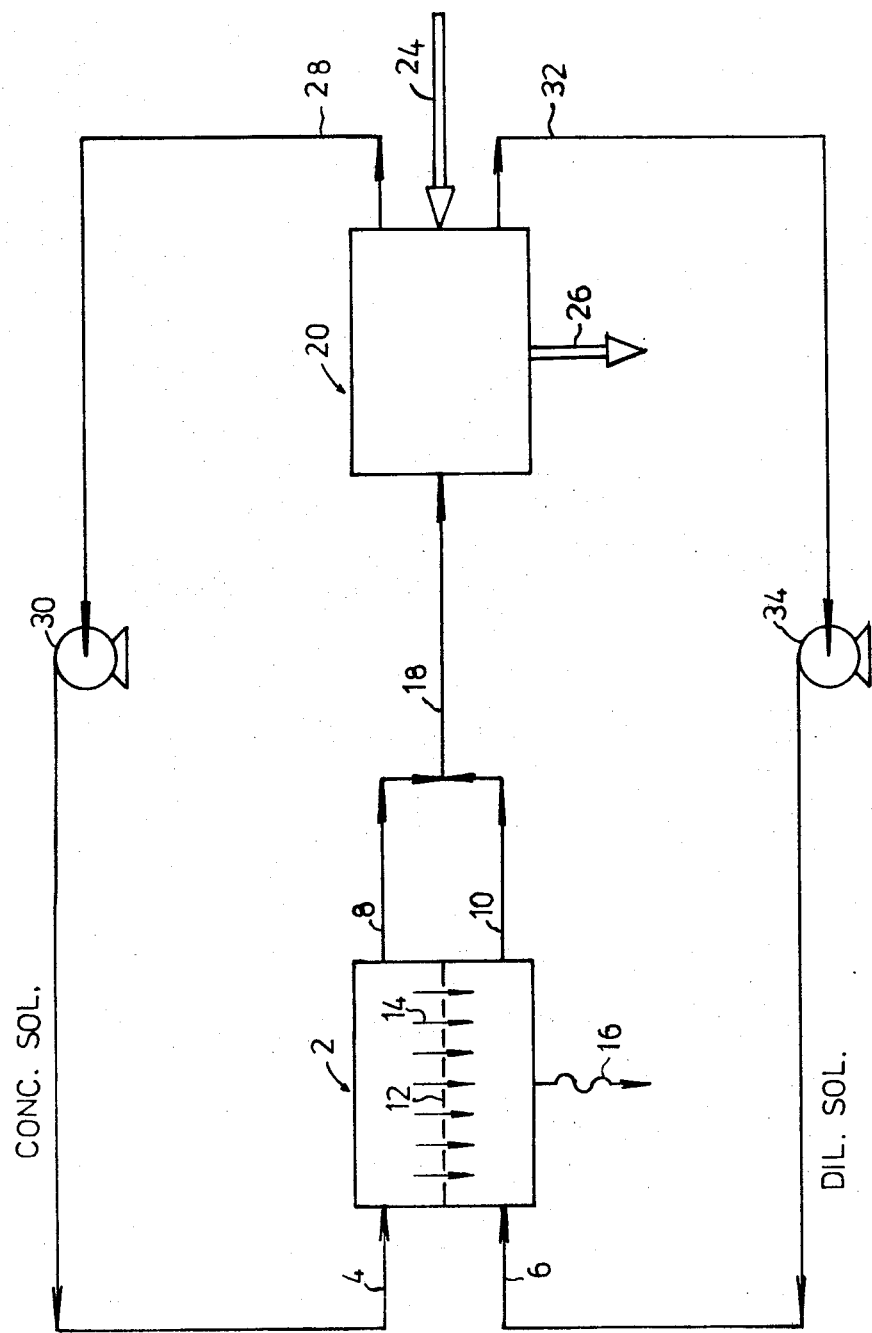
FIG. 1 illustrates the generalized concept of a RED (Reverse Electrodialysis) heat-engine constructed in accordance with the invention.

With reference to FIG. 1 illustrating the generalized concept of a RED heat-engine in accordance with the invention, the heat-engine therein illustrated includes a RED membrane unit, generally designated 2, having two pathways therethrough for the mixing pairs. Thus, the concentrated ionic solution flows through one pathway defined by inlet 4 and outlet 8, and the dilute ionic solution flows through a second pathway defined by inlet 6 and outlet 10, the two pathways being separated by membranes, generally designated 12, included in a memory stack. The unit further includes an electrode at each end across which an electrical voltage and current are generated during the passage of solute from the concentrated solution flowing along the first pathway through the membranes to the dilute solution flowing through the second pathway, as shown by arrows 14. An electrical output is thus produced across the two electrodes, as shown by arrow 16.

Figure 1A:
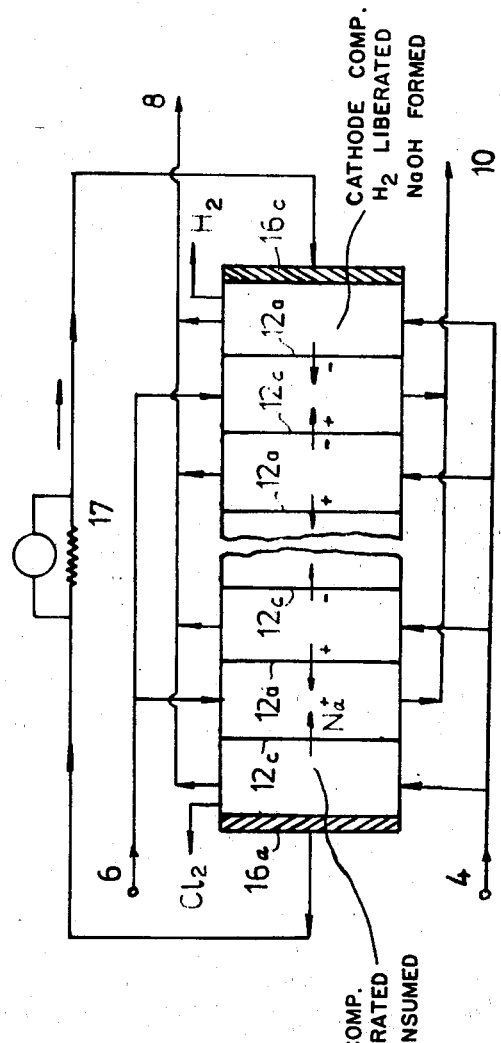
FIG. 1a illustrates the RED unit in the heat-engine of FIG. 1.

A known RED unit which may be used for unit 2 in the heat engine of FIG. 1 is shown in FIG. 1a. It includes a membrane stack having alternating anion exchange membranes 12a and cation exchange membranes 12c, an anode 16a at one end of the unit, and a cathode 16c at the opposite end. As indicated above, when these electrodes are connected through an external resistance, indicated at 17 in FIG. 1a, current will flow and useful energy will be obtained, this useful output energy being schematically indicated in FIG. 1 by the output arrow 16 from the RED unit 2. Further details of the construction and operation of such known RED units may be had by reference to the above-cited publication.

The concentrated solution introduced through inlet 4 less the portion of the solute passing through the membranes 12 in the RED unit 2 are fed via outlet 8 to the inlet 18 of a thermal unmixing unit 20. In addition, the dilute solution exiting from the outlet 10 of the RED unit 2, together with the portion of the solute passing through the membranes 12, is added to the concentrated solution at inlet 18 as the latter is introduced into the thermal unmixing unit 20.

The original mixing pair (i.e., the concentrated solution introduced into inlet 4 and the dilute solution introduced into inlet 6) are regenerated from the two solutions (or "spent brine") exiting from the RED unit 2 in the thermal unmixing unit 20 by heat from a heat source 24, or by heat rejection to a heat sink 26, as will be described more particularly below. The regenerated concentrated solution leaves the thermal unmixing unit 20 via outlet 28 and is recycled by circulating pump 30 back to the inlet 4 of the RED unit 2; and the regenerated dilute solution leaves unit 20 via outlet 32 and is recycled by circulating pump 34 back to the inlet 6 of the RED unit 2.

The required concentration in the regenerated dilute solution may be obtained by suitably controlling the thermal unmixing or separator unit 20, or by adding the appropriate amount of regenerated concentrated solution to the regenerated dilute solution after the thermal separation.

In the RED heat-engine illustrated in FIG. 1, as in all heat-engines, heat must be both absorbed and rejected. Assuming, for example, that thermal unmixing in unit 20 occurs by heat absorption, heat rejection must then also occur at some appropriate place in the heat engine, as will be shown in the specific embodiments of the invention described below. However, for purposes of clarity, heat absorption and rejection are both represented in FIG. 1, by arrow 24 and 26, respectively, as occurring only at the thermal unmixing unit 20.

Figure 2A:
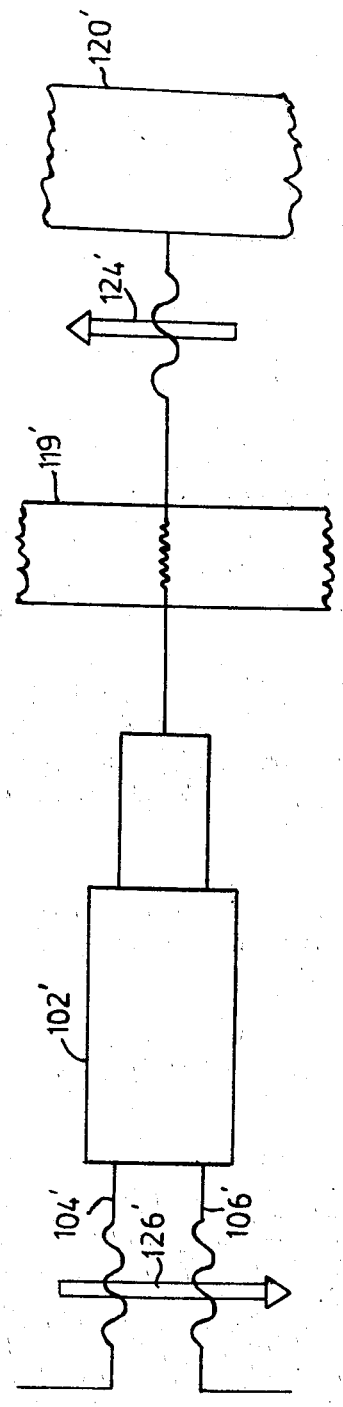
FIG. 2a illustrates a variation in the heat-engine of FIG. 2.
Figure 2:
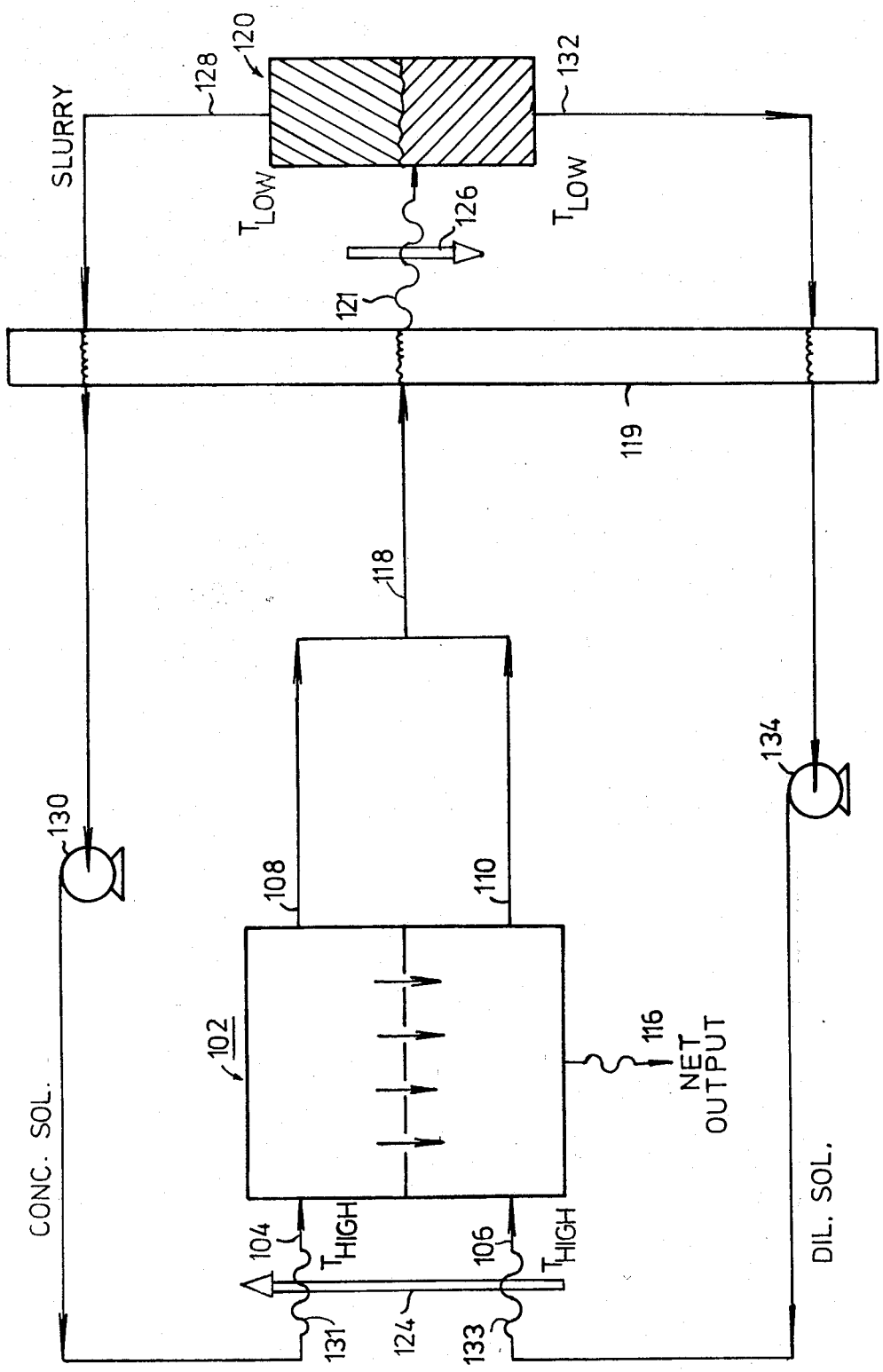
FIG. 2 illustrates an example of a RED heat-engine constructed in accordance with the invention utilizing thermal unmixing by separation into a solid phase and a liquid phase.

FIG. 2 illustrates an embodiment of the invention wherein unmixing or separation to regenerate the original two solutions is effected by cooling to form a liquid phase and a solid phase whose solubility in the liquid is a function of temperature. An example of such a system is $KNO_3$ and water.

Thus, in the heat-engine of FIG. 2, the concentrated ionic solution is introduced into the RED unit 102 at a high temperature ($T_{high}$) via inlet 104 and exits from the unit, somewhat diluted, via outlet 108. The dilute solution is introduced into the RED unit 102 at a high temperature ($T_{high}$) via inlet 106, and exits somewhat concentrated via its outlet 110. The two outletted solutions are then mixed, at 118, to form the spent brine. The latter is passed through a heat-exchanger 119 where it is partially cooled, and then passed through a cooler 120 where it is finally cooled to the minimum temperature in the system, the cooler 120 involving heat rejection, as shown by arrow 126, to a heat sink.

In the example of FIG. 2, the thermal unmixing in separator 120 is effected by separating into a liquid phase and a solid phase, the mixing pair therefore being constituted of a solvent (e.g., water) and a solute (e.g., $KNO_3$) whose solubility is a function of temperature. Accordingly, the regenerated concentrated solution exiting from the separator 120 via outlet 128 would be a slurry, i.e., a mixture of a solid solute and liquid. This slurry, which is pumped by circulating pump 130, would be partially dissolved by heating in the heat-exchanger 119, and finally dissolved in the heater 131 by the heat source 124 before entering the concentrated solution inlet 104 of the RED unit 102. The regenerated dilute solution exits from separator 120 via outlet 132 and is pumped by circulating pump 134 through heat-exchanger 119 where it is partially heated, and through heater 133 where it is finally heated from heat source 124 before entering the dilute solution inlet 106 of the RED unit 102.

The electrical energy generated across the electrodes in the RED unit 102 is outputted at 116.

It will be appreciated that thermal unmixing could also be carried out by using a solute which becomes less soluble as the temperature increases. In such cases, the process would be the same as shown in FIG. 2, except that the heat source (124) and the cooler (126) would be interchanged, whereupon the separator unit (120) would operate at the maximum temperature, and the RED unit (102) would operate at the maximum temperature.

This modification is illustrated in FIG. 2a, wherein it will be seen that the heat source 124' heats the spent brine leaving the heat-exchanger 119' (wherein it was partially heated rather than partially cooled) before it is introduced into the separator 120'; and the separated, regenerated concentrated and dilute solutions are cooled, by cooler 126', before being recycled back into the two inlets 104' and 106', respectively, of the RED unit 102'.

Figure 3:
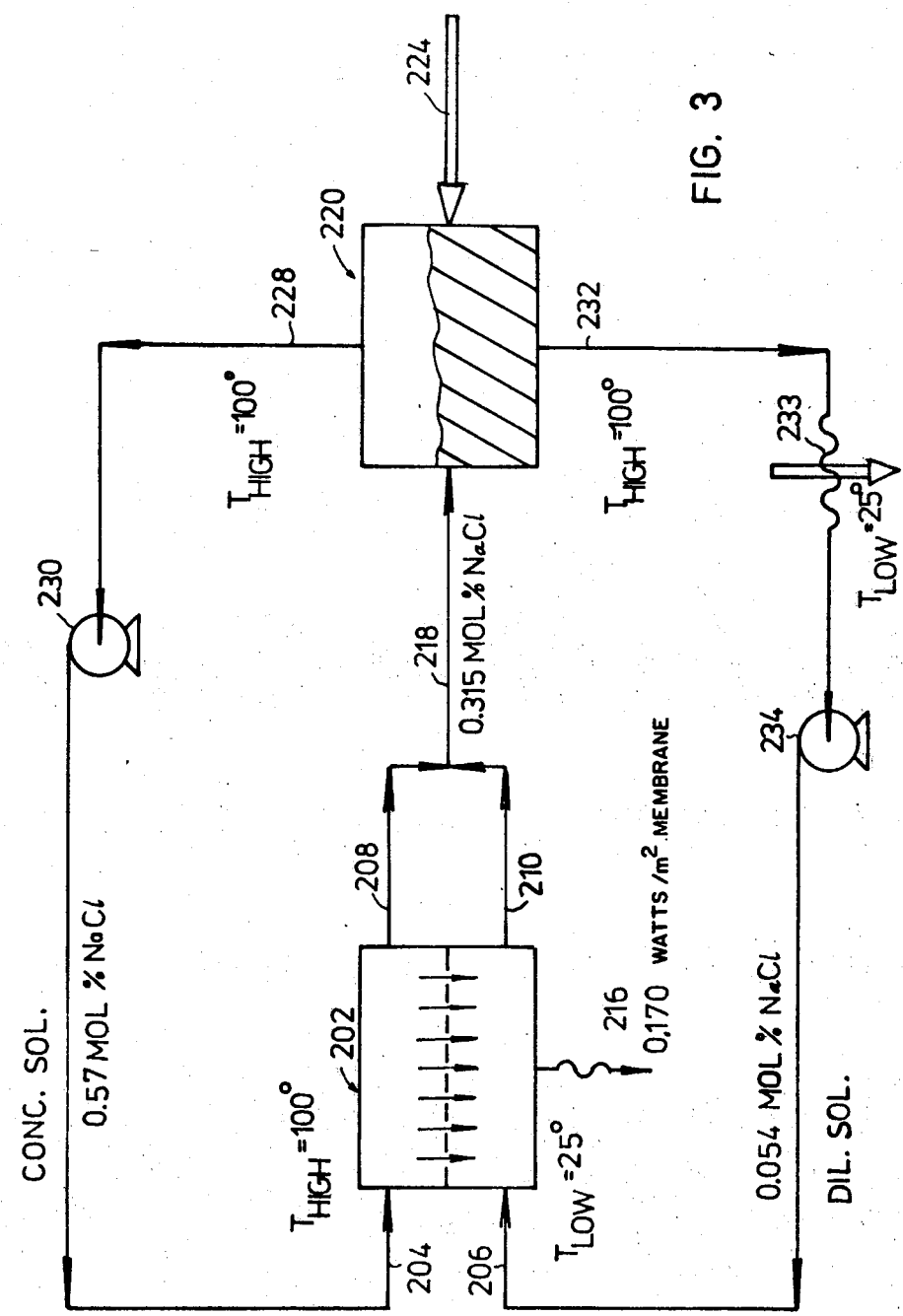
FIG. 3 illustrates an example of a RED heat-engine in accordance with the invention utilizing thermal unmixing by distillation.

FIG. 3 illustrates an embodiment of the invention wherein the thermal unmixing or separation is effected by distillation. In this case, the concentrated solution at a high temperature enters inlet 204 of the RED unit 202 and exits, somewhat diluted, via outlet 208; whereas the dilute solution at a low temperature enters unit 202 via inlet 206 and exits, somewhat concentrated, via outlet 210. The two exiting solutions are mixed at 218 to form the spent brine. The latter is introduced into the thermal unmixing unit 220, which in this case is a distillation unit receiving heat from a heat source 224. The separated, regenerated concentrated solution leaves separator 220 via line 228 and is pumped by circulating pump 230 back to inlet 204; whereas the distillate vapor leaves separator 220 via outlet 232, is condensed in condenser 233 to form the regenerated dilute solution, and is then recycled by circulating pump 234 back to its inlet 206.

The electrical energy generated across the electrodes in the RED unit 202 is outputted at 216.

As one example where thermal unmixing may be effected by distillation, the mixing pair could be aqueous solutions of sodium chloride. FIG. 3 includes legends illustrating an example of operating conditions when using a solution of sodium chloride.

Because of the high volumetric latent heat of vaporization of water, the use of water increases the heat required for the useful energy produced, which decreases the thermal efficiency of the process. For this reason, it may be desirable to use ionizing solvents which have a lower volumetric latent heat of vaporization than water, such as methyl and ethyl alcohol. Examples of the solute that could be used would include ferric chloride and sodium nitrate.

Examples of other liquid-solid systems, such as decribed in FIG. 2, could include water with sodium laurate, myristate, or palmitate, as well as their sulfonate and sulfate derivatives.

Many other variations, modifications and applications of the illustrated embodiments of the invention will be apparent.

What is claimed is:

1. A method of generating power, comprising:
   (A) passing a concentrated ionic solution through a first pathway in a reverse electrodialysis unit including a membrane stack having alternating cation and anion exchange membranes and an electrode at each end of the stack
   (B) passing a dilute ionic solution through a second pathway in said reverse electrodialysis unit, whereby solute from the concentrated solution in the first pathway passes through the membranes to the dilute solution in the second pathway, this being accompanied by the generation of an output electrical current and voltage;
   (C) regenerating by thermal separation the original concentrated and dilute ionic solutions from the solutions exiting from the reverse electrodialysis unit; and
   (D) recycling said regenerated and dilute solutions back through said respective first and second pathways in the reverse electrodialysis unit.

2. The method according to claim 1, wherein said exiting solutions are cooled before being separated into the regenerated concentrated and dilute solutions, the regenerated concentrated and dilute solutions being reheated after being separated and before being recycled back into the reverse electrodialysis unit.

3. The method according to claim 1, wherein said exiting solutions are heated before being separated into the regenerated concentrated and dilute solutions, the regenerated concentrated and dilute solutions being cooled after being separated and before being recycled back through the reverse electrodialysis unit.

4. The method according to any one of claims 1–3, wherein the thermal separation is effected by using, for the concentrated and dilute solutions, a liquid and a solid whose solubility in the liquid is a function of temperature.

5. The method according to claim 1, wherein the thermal separation is effected by distillation.

6. A heat-engine for generating power, comprising:
   (A) a reverse electrodialysis unit including a membrane stack having alternating cation and anion exchange membranes, an electrode at each end of the stack, a first pathway through the reverse electrodialysis unit for a concentrated ionic solution, and a second pathway through the reverse electrodialysis unit for a dilute ionic solution;
   (B) means for introducing a concentrated ionic solution into said first pathway;
   (C) means for introducing a dilute ionic solution into said second pathway, whereby solute from the concentrated solution in the first pathway passes through the membranes to the dilute solution in the second pathway, this being accompanied by the generation of an output electrical current and voltage;
   (D) thermal separation means for regenerating the original concentrated and dilute ionic solutions from the solutions exiting from the reverse electrodialysis unit; and
   (E) recycling means for recycling said regenerated concentrated and dilute solutions back to said first and second pathways in the reverse electrodialysis unit.

7. A heat-engine according to claim 6, wherein said thermal separation means includes means for cooling the two solutions exiting from the reverse electrodialysis unit before being separated into the regenerated concentrated and dilute solutions, and means for reheating the regenerated concentrated and dilute solutions after being separated but before being recycled back to said first and second pathways in the reverse electrodialysis unit.

8. A heat-engine according to claim 6, wherein said thermal separation means includes means for heating the two solutions exiting from the reverse electrodialysis unit before being separated into the regeneration concentrated and dilute solutions, and means for cooling the regenerated concentrated and dilute solutions after being separated but before being recycled back to said first and second pathways in the reverse electrodialysis unit.

9. A heat-engine according to claim 6, wherein said thermal separation means comprises a distillation unit.

* * * * *